(12) United States Patent
Cheng et al.

(10) Patent No.: US 11,693,265 B2
(45) Date of Patent: Jul. 4, 2023

(54) POLARIZATION MODULATOR

(71) Applicant: Meta Platforms Technologies, LLC, Menlo Park, CA (US)

(72) Inventors: Hsien-Hui Cheng, Redmond, WA (US); Yang Zhao, Kirkland, WA (US); Hannah Noble, Sunnyvale, CA (US); Fenglin Peng, Redmond, WA (US); Lu Lu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 104 days.

(21) Appl. No.: 17/330,422

(22) Filed: May 26, 2021

(65) Prior Publication Data

US 2022/0382080 A1    Dec. 1, 2022

(51) Int. Cl.
*G02F 1/1347* (2006.01)
*G02F 1/01* (2006.01)
*G02B 27/01* (2006.01)
*G02F 1/139* (2006.01)

(52) U.S. Cl.
CPC ....... *G02F 1/0136* (2013.01); *G02B 27/0172* (2013.01); *G02F 1/139* (2013.01); *G02F 1/1347* (2013.01); *G02B 2027/0178* (2013.01)

(58) Field of Classification Search
CPC ............. G02F 1/1335; G02F 1/133528; G02F 1/133531; G02F 1/133541; G02F 1/0136; G02F 1/1347; G02F 1/139; G02B 27/0172; G02B 2027/0178
See application file for complete search history.

(56) References Cited

U.S. PATENT DOCUMENTS

| | | | |
|---|---|---|---|
| 4,991,924 | A | 2/1991 | Shankar et al. |
| 5,658,490 | A | 8/1997 | Sharp et al. |
| 10,678,057 | B2 | 6/2020 | Lu et al. |
| 2016/0187717 | A1 | 6/2016 | Hosokawa et al. |
| 2019/0227375 | A1 | 7/2019 | Oh et al. |

FOREIGN PATENT DOCUMENTS

WO    WO 2012/130302    * 10/2012 ........... G02F 1/1347

OTHER PUBLICATIONS

International Search Report and Written Opinion for International Application No. PCT/US2022/029356 dated Aug. 19, 2022, 12 pages.

* cited by examiner

*Primary Examiner* — Thoi V Duong
(74) *Attorney, Agent, or Firm* — Freestone Intellectual Property Law PLLC; Aaron J. Visbeek

(57) ABSTRACT

A polarization modulator includes a first liquid crystal cell and a second liquid crystal cell. The first liquid crystal cell has a first type of liquid crystals configured to rotate an optical axis of light parallel to a first plane of the first liquid crystal cell. The second liquid crystal cell is configured to receive the light from the first liquid crystal cell. The second liquid crystal cell has a second type of liquid crystals configured to rotate the optical axis of the light perpendicular to a second plane of the second liquid crystal cell.

19 Claims, 10 Drawing Sheets

$$\Gamma\_E_{V-state\_Color} \equiv \int \overline{y(\lambda)} \Gamma\_E_{V-state}(\lambda) d\lambda \Big/ \int \overline{y(\lambda)} d\lambda$$

FIG. 7A

$$\Gamma\_E_{2states\_Color} \equiv \Gamma\_E_{0V\_Color} + \Gamma\_E_{10V\_Color}$$

FIG. 7B

POLARIZATION MODULATOR

TECHNICAL FIELD

This disclosure relates generally to optics, and in particular to polarization modulation.

BACKGROUND INFORMATION

Polarization rotators are used in optics to modulate the polarization orientation of light. For example, a switchable half-waveplate may modulate incoming right-hand circularly polarized light between left-hand circularly polarized light and right-hand circularly polarized light exiting the switchable half-waveplate. These conventional switchable half-waveplates may include two twisted liquid crystal cells, for example. However, in some optical contexts, using these conventional switchable half-waveplates limits the field of view and includes unwanted retardance error across visible wavelengths.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 7A and 7B illustrate equations for configuring a polarization modulator to reduce retardance error for green light, in accordance with aspects of the disclosure.

DETAILED DESCRIPTION

Figure 1:
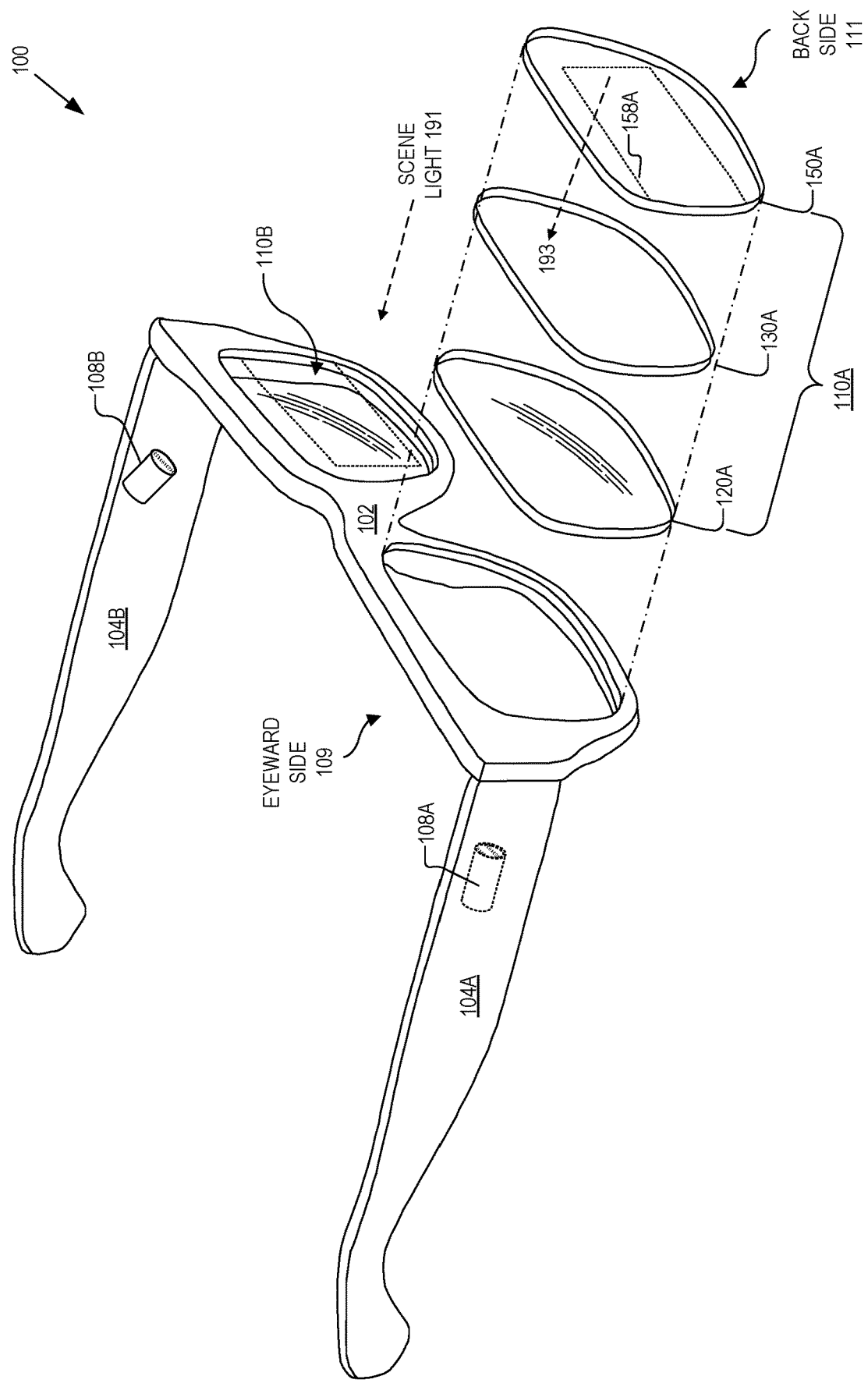
FIG. 1 illustrates an example head mounted device that includes a polarization modulator, in accordance with aspects of the disclosure.

Embodiments of polarization modulators are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

In aspects of this disclosure, the term "transparent" may be defined as having greater than 90% transmission of light. In some aspects, the term "transparent" may be defined as a material having greater than 90% transmission of visible light.

Implementations of a polarization modulator having liquid crystal cells with different types of liquid crystals are described in this disclosure. Conventional polarization modulators such as switchable waveplates limit the field of view of the output light and may introduce undesirable chromatic aberration. Subsequent designs included adding a viewing angle compensation film to the switchable waveplate. However, this only improved the viewing angle compensation for one state of the switchable waveplate. Thus, existing polarization modulators introduce chromatic aberration and limit the viewing angle (at least in one state).

Implementations of the disclosure include a switchable polarization modulator that is achromatic (or approaching achromatic) and includes a wide viewing angle in both a first-state (e.g. zero retardance state) and second-state (e.g. π retardance state) of the switchable polarization modulator. Furthermore, the disclosed switchable polarization modulator may be designed to reduce or minimize retardation error for green light to optimize for human eye sensitivity. The switchable polarization modulator includes a first liquid crystal cell and a second liquid crystal cell. The first liquid crystal cell has a first type of liquid crystals configured to rotate an optical axis of light parallel to a first plane of the first liquid crystal cell. The second liquid crystal cell is configured to receive the light from the first liquid crystal cell. The second liquid crystal cell has a second type of liquid crystals configured to rotate the optical axis of the light perpendicular to a second plane of the second liquid crystal cell.

An example implementation further includes a third liquid crystal cell having the first type of liquid crystals where the second liquid crystal cell is disposed between the first liquid crystal cell and the third liquid crystal cell. The first liquid crystal cell and the third liquid crystal cell may be configured as switchable quarter-waveplates and the second liquid crystal cell may be configured as a switchable half-waveplate. When the switchable half-waveplate is in a zero retardance state, the first liquid crystal cell and the third liquid crystal cell function as a viewing angle compensation film to increase the viewing angle of light exiting the polarization modulator. When the switchable half-waveplate is in a π retardance state, the viewing angle is already sufficient and the first liquid crystal cell and the third liquid crystal cell are aligned in the same direction. These and other embodiments are described in more detail in connection with FIGS. 1-8.

FIG. 1 illustrates an example head mounted device 100 that includes a polarization modulator, in accordance with aspects of the present disclosure. The illustrated example of head mounted device 100 is shown as including a frame 102, temple arms 104A and 104B, and near-eye optical elements 110A and 110B. Head mounted device 100 is worn on or about a head of a user. Head mounted device 100 may include a display such that head mounted device 100 is considered a pair of augmented-reality glasses. Implementations of this disclosure may also be implemented in a virtual reality headset or electronic glasses. Eye-tracking cameras 108A and 108B are shown as coupled to temple arms 104A and 104B, respectively. FIG. 1 also illustrates an exploded view of an example of near-eye optical element 110A. Near-eye optical element 110A is shown as including a display layer 150, a polarization modulator layer 130, and an optical element 120A. Polarization modulators 333 or 533 described below may be included in polarization modulator 130A, in various implementations. Display layer 150A may be bonded to polarization modulator 130A. Display layer 150A may include a waveguide 158 that is configured to direct virtual images in image light 193 to an eye of a user of head mounted device 100. Optical layer 120A may include a lens element that assists in focusing image light 193 to the eye of a user.

As shown in FIG. 1, frame 102 is coupled to temple arms 104A and 104B for securing the head mounted device 100 to the head of a user. Example head mounted device 100 may also include supporting hardware incorporated into the frame 102 and/or temple arms 104A and 104B. The hardware of head mounted device 100 may include any of processing logic, wired and/or wireless data interface for sending and receiving data, graphic processors, and one or more memories for storing data and computer-executable instructions. In one example, head mounted device 100 may be configured to receive wired power and/or may be configured to be powered by one or more batteries. In addition, head mounted device 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light 191 (propagating from a back side 111 of optical elements 110 to an eyeward side 109 of optical elements 110) from the environment while also receiving image light 193 directed to their eye(s) by way of display layer 150A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

Display layer 150A may include one or more other optical elements depending on the design of the head mounted device 100. For example, the display layer 150A may include a waveguide 158 to direct image light 193 generated by an electronic display to the eye of the user. In some implementations, at least a portion of the electronic display is included in the frame 102 of the head mounted device 100. The electronic display may include an LCD, an organic light emitting diode (OLED) display, micro-LED display, pico-projector, or liquid crystal on silicon (LCOS) display for generating the image light 193.

Optical layer 120A may have one or more lens curvatures for focusing light (e.g., image light 193 and/or scene light 191) to the eye of the user on the eyeward side 109 of the near-eye optical element 110A. In some aspects, the optical layer 120A has a thickness and/or curvature that corresponds to the specifications of a user. In other words, optical layer 120A may be a prescription lens. Thus, the optical layer 120A may, in some examples, be referred to as an ophthalmic lens. However, in other examples, optical layer 120A may be a non-prescription lens.

Figure 2:
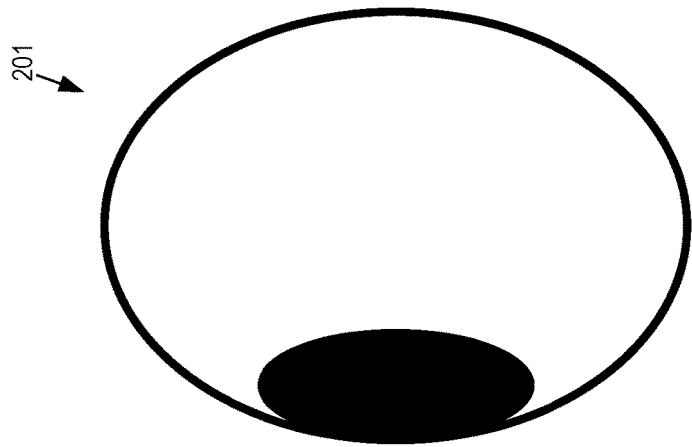
FIG. 2 illustrates a polarization modulation layer changing a polarization orientation of image light emitted by a display layer, in accordance with aspects of the disclosure.
Figure 2:
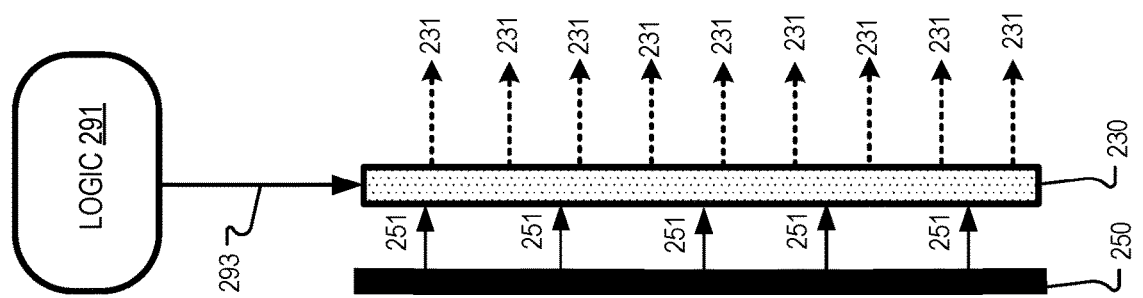

FIG. 2 illustrates a polarization modulation layer 230 changing a polarization orientation of image light 251 emitted by display layer 250, in accordance with implementations of the disclosure. Display system 200 presents images to eye 201. In operation, display layer 250 emits image light 251. Processing logic 291 is configured to drive a modulation command 293 onto polarization modulation layer 230 to modulate the polarization orientation of image light 231 that exits polarization modulation layer 230. In an implementation, polarization modulation layer 230 modulates image light 231 between a first circular polarization orientation and a second circular polarization orientation having an opposite handedness as the first circular polarization orientation. For example, image light 231 may be modulated between right-hand circular polarized light and left-hand circular polarized light and polarization modulation layer 230 may be a switchable half-waveplate. Modulation command 293 may be a voltage that switches between 10 VDC and 0 VDC to switch the switchable half-waveplate, for example.

Figure 3:
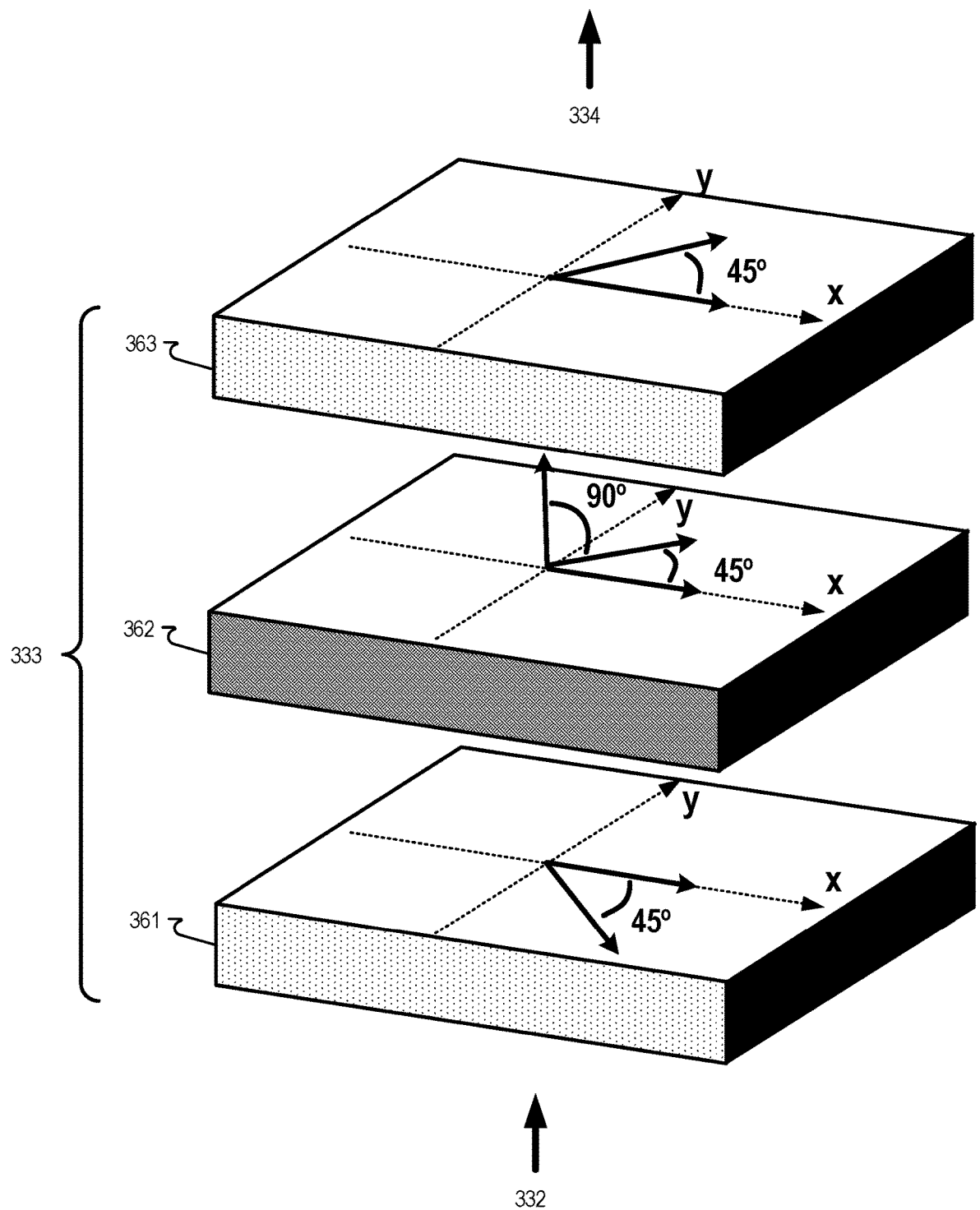
FIG. 3 illustrates an example polarization modulator that includes liquid crystal cells having differing liquid crystal types, in accordance with aspects of the disclosure.

FIG. 3 illustrates an example polarization modulator 333 that includes liquid crystal cells having differing liquid crystal types, in accordance with aspects of the disclosure. First liquid crystal cell 361 has a first type of liquid crystals configured to rotate an optical axis of light parallel to a first plane of the first liquid crystal cell 361. In the particular illustration of FIG. 3, an optical axis of input light 332 propagating orthogonal to the plane of first liquid crystal cell 361 is rotated 45 degrees parallel to the plane of the first liquid crystal cell, where the plane is defined by the illustrated x-y axis of first liquid crystal cell 361.

The first type of liquid crystal that is included in first liquid crystal cell 361 may be one or more of ferroelectric liquid crystals, in plane switching liquid crystals, fringe field switching liquid crystals, uniform lying helix liquid crystals, or cholesteric liquid crystals, for example.

Second liquid crystal cell 362 receives the light from the first liquid crystal cell 361. Second liquid crystal cell 362 has a second type of liquid crystals configured to rotate the optical axis of the light perpendicular to a second plane of the second liquid crystal cell 362, where the second plane is defined by the illustrated x-y axis of second liquid crystal cell 362. In FIG. 3, a plane of rotation of the light is forty-five degrees to the x-axis of the second plane of the second liquid crystal cell 362 and the optical axis of the light is rotated ninety degrees to be perpendicular to the second plane of the second liquid crystal cell 362.

The first plane of first liquid crystal cell 361 may be parallel to the second plane of second liquid crystal cell 362. The second type of liquid crystals is different from the first type of liquid crystals. The second type of liquid crystal that is included in second liquid crystal cell 362 may be one or more of optically compensated bend (OCB) liquid crystals, electronically controlled birefringence (ECB) liquid crystals, or vertical alignment liquid crystals, for example.

The illustrated polarization modulator 333 includes a third liquid crystal cell 363, although in some implementations of the disclosure, the polarization modulator may only include the first liquid crystal cell 361 and the second liquid crystal cell 362. In the illustrated implementation, third liquid crystal cell 363 receives the light from second liquid crystal cell 362 and second liquid crystal cell 362 is disposed between first liquid crystal cell 361 and third liquid crystal cell 363.

The third liquid crystal cell 363 has the first type of liquid crystal cell that is configured to rotate the optical axis of the light parallel to the plane of the liquid crystal cell. In FIG. 3, third liquid crystal cell 363 is configured to rotate the optical axis of the light parallel to the third plane of the third liquid crystal cell, where the third plane is defined by the illustrated x-y axis of third liquid crystal cell 363. Therefore, light propagating orthogonal to the third plane of third liquid crystal cell 363 is rotated 45 degrees parallel to the plane of the third liquid crystal cell. The third plane of third liquid crystal cell 363 may be parallel to the second plane of second liquid crystal cell 362 and the second plane of second liquid crystal cell 362 may be parallel to the first plane of first liquid crystal cell 361.

While first liquid crystal cell 361, second liquid crystal cell 362, and third liquid crystal cell 363 are illustrated spaced apart for ease of illustration, first liquid crystal cell 361, second liquid crystal cell 362, and third liquid crystal cell 363 may be coupled together with little or no space between them, in some implementations of polarization modulator 333.

Figure 4B:
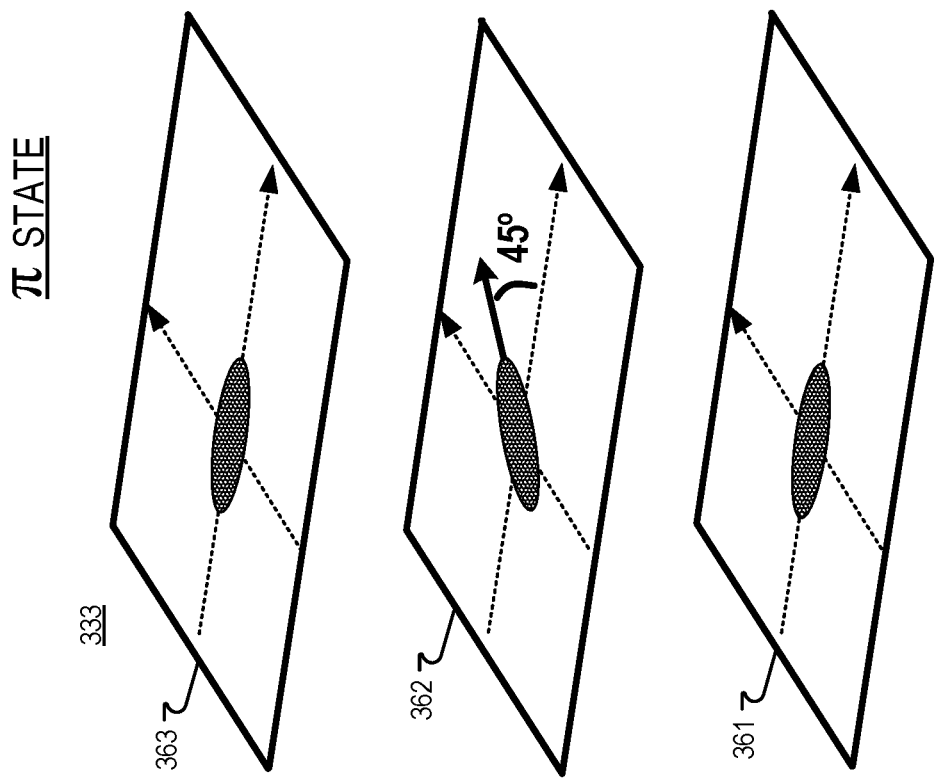
FIGS. 4A and 4B illustrate that a first liquid crystal cell and third liquid crystal cell may be configured as switchable quarter-waveplates and a second liquid crystal cell may be configured as a switchable half-waveplate, in accordance with aspects of the disclosure.
Figure 4A:
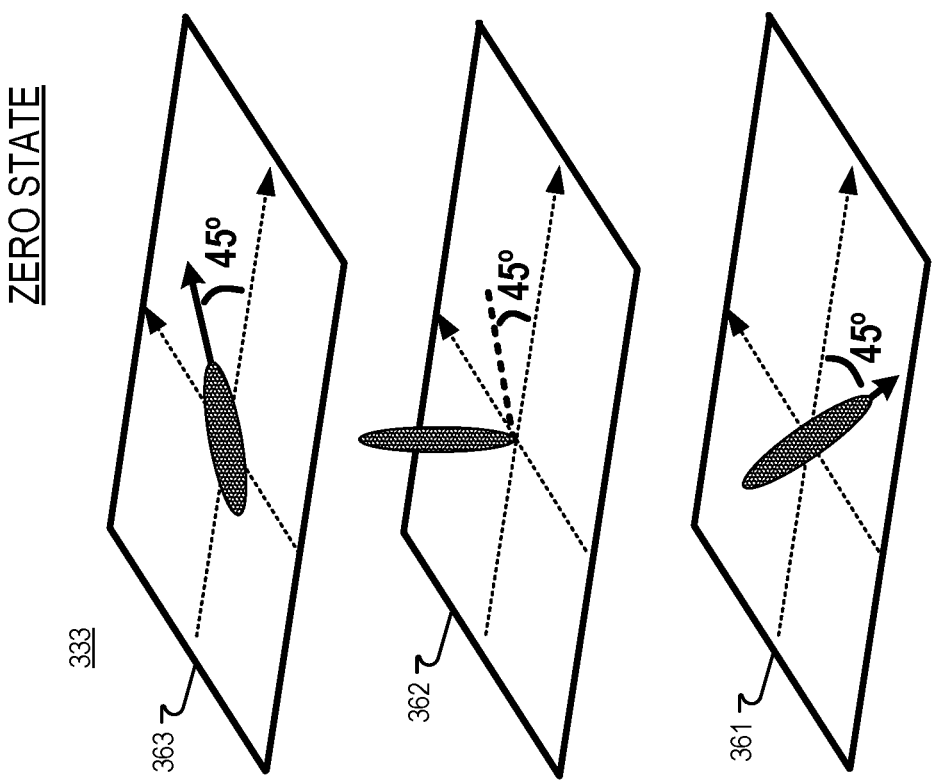

FIGS. 4A and 4B illustrate that first liquid crystal cell 361 and third liquid crystal cell 363 may be configured as switchable quarter-waveplates and second liquid crystal cell 362 may be configured as a switchable half-waveplate, in accordance with aspects of the disclosure. In this configuration, polarization modulator 333 may function as a switchable half-waveplate having a zero retardance state (FIG. 4A) and a π retardance state (FIG. 4B). FIGS. 4A and 4B provide additional illustration of the effect that each liquid crystal cell has on the optical axis of the light propagating through each liquid crystal cell.

Figure 5A:
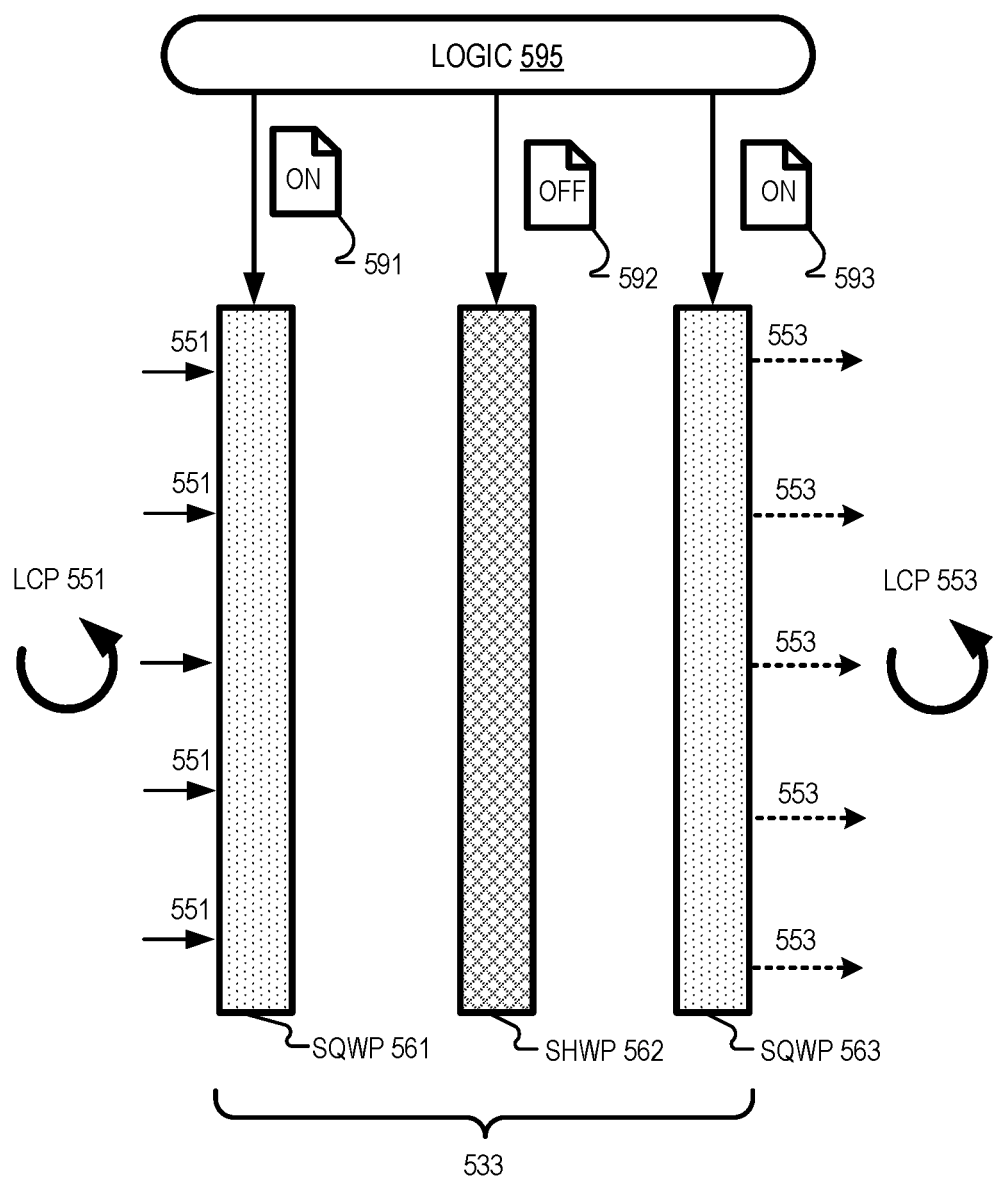
FIGS. 5A and 5B illustrate a polarization modulation system operating in a zero retardance state and a π retardance state, in accordance with aspects of the disclosure.
Figure 5B:
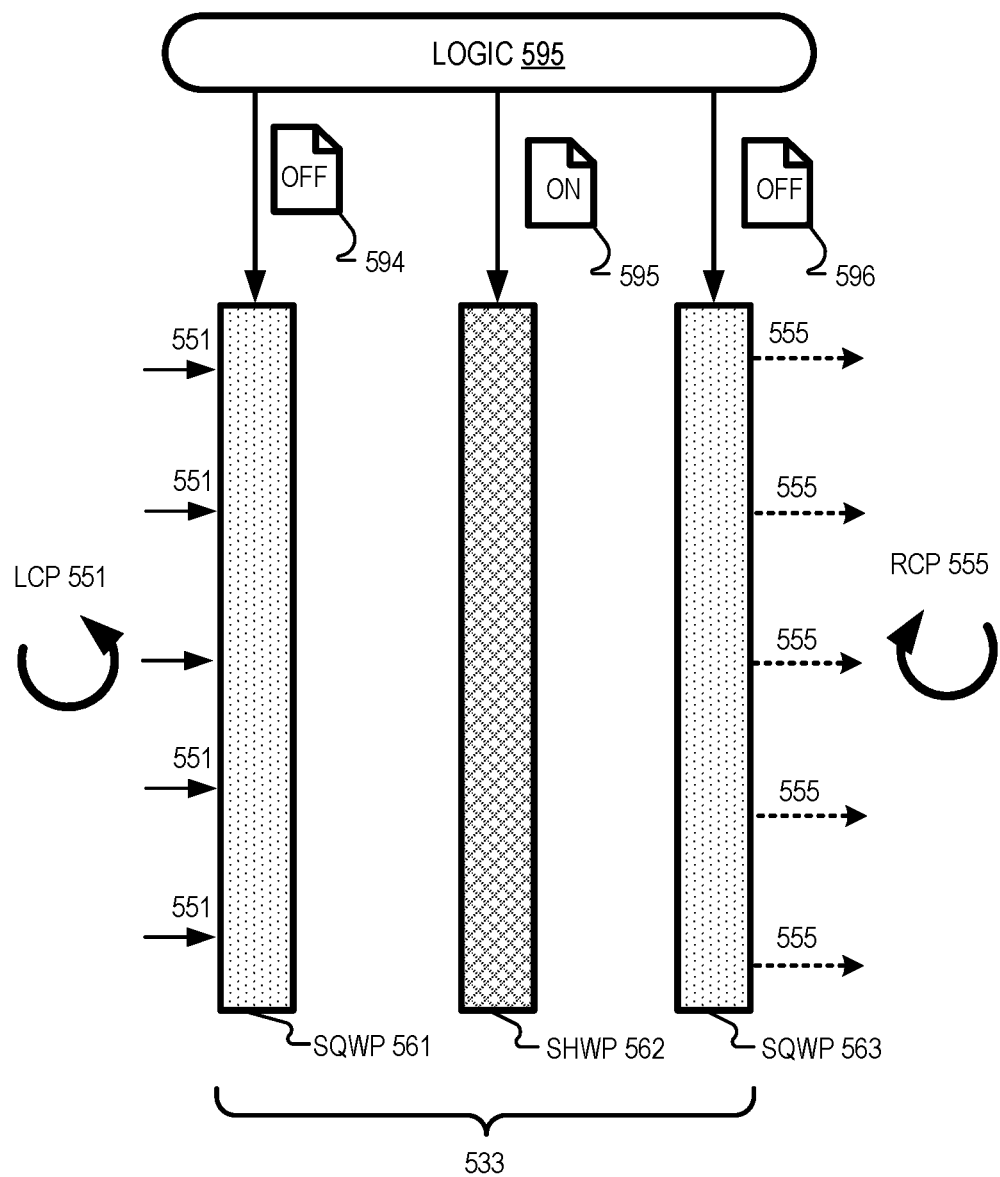

FIGS. 5A and 5B illustrate a polarization modulation system 500 operating in a zero retardance state and a π retardance state, in accordance with implementations of the disclosure. Polarization modulation system 500 includes processing logic 595 and polarization modulator 533 that includes first switchable quarter-waveplate 561, switchable half-waveplate 562, and second switchable quarter-waveplate 563. First liquid crystal cell 361 is configured as first switchable quarter-waveplate 561, second liquid crystal cell 362 is configured as switchable half-waveplate 562, and third liquid crystal cell 363 is configured as second switchable quarter-waveplate 563, in FIGS. 5A and 5B. Processing logic 595 may drive polarization modulator 533 between the zero retardance state and the π retardance state in a switching time of 1 ms or less, for example.

Processing logic 595 is coupled to drive a first modulation command 591 onto first switchable quarter-waveplate 561 to drive first switchable quarter-waveplate 561 to a first state (e.g. switch off) or a second state (e.g. switch on). Processing logic 595 is coupled to drive a second modulation command 592 onto switchable half-waveplate 562 to drive switchable half-waveplate 562 to a first state (e.g. off) or a second state (e.g. on). Processing logic 595 is coupled to drive a third modulation command 593 onto second switchable quarter-waveplate 563 to drive second switchable quarter-waveplate 563 561 to a first state (e.g. switch off) or a second state (e.g. switch on). Modulation commands 591, 592, and 593 may be a voltage that switches between 10 VDC and 0 VDC to switch the waveplates between states, for example. A first state of a particular waveplate may be described as "off" and a second state of the particular waveplate may be described as "on" in this disclosure, for ease of reference.

FIG. 5A illustrates a zero retardance state of polarization modulation system 500 where input light 551 entering polarization modulator 533 has a first circular polarization orientation and output light 553 exiting polarization modulator 533 has the same handedness as the input light 551 entering polarization modulator 533. In other words, the light propagating through polarization modulator 533 retains its handedness of circular polarization as it exits. In the particular illustrated implementation, input light 551 is left-hand circularly polarized light and output light 553 is also left-hand circularly polarized light. However, in different implementations, input light 551 is right-hand circularly polarized light and output light 553 is also right-hand circularly polarized light.

In the zero retardance state of FIG. 5A, modulation command 591 and 593 from processing logic 595 activate first switchable quarter-waveplate 561 and second switchable quarter-waveplate 563 to an on state while modulation command 592 from processing logic 595 deactivates switchable half-waveplate 562 to an off state. In the zero retardance state, the first liquid crystal cell 361 of first switchable quarter-waveplate 561 and third liquid crystal cell 363 of second switchable quarter-waveplate 563 work together as viewing angle compensation layers for second liquid crystal cell 362 of switchable half-waveplate 562 and also cancel each other out to turn off effect of switchable half-waveplate 562. The reason first switchable quarter-waveplate 561 and second switchable quarter-waveplate 563 cancel each other out in the zero retardance state is because the first switchable quarter-waveplate 561 (when switched on) and the second switchable quarter-waveplate 563 (when switched on) are configured to rotate the optical axis to be opposite and orthogonal to each other. Furthermore, since first switchable quarter-waveplate 561 and second switchable quarter-waveplate 563 include the same type of liquid crystals and cancel each other, they are also achromatic when paired together.

In the π retardance state of FIG. 5B, modulation command 591 and 593 from processing logic 595 deactivate (switch off) first switchable quarter-waveplate 561 and second switchable quarter-waveplate 563 while modulation command 592 from processing logic 595 activates switchable half-waveplate 562 to an on state. In the π retardance state, the first liquid crystal cell 361 of first switchable quarter-waveplate 561 and third liquid crystal cell 363 align in the same direction to function (together) as a half-waveplate and the second liquid crystal cell 362 of switchable half-waveplate aligns in a 45 degree direction to turn on achromatic functionality. The viewing angle in the π retardance state is already satisfactory so viewing angle compensation functionality is not needed in the π retardance state.

FIG. 5B illustrates a π retardance state of polarization modulation system 500 where input light 551 entering polarization modulator 533 has a first circular polarization orientation and output light 555 exiting polarization modulator 533 has the opposite handedness as the input light 551 entering polarization modulator 533. In the particular illustrated implementation, input light 551 is left-hand circularly polarized light and output light 555 is changed to right-hand circularly polarized light. However, in different implementations, input light 551 is right-hand circularly polarized light and output light 555 is left-hand circularly polarized light.

Figure 6A:
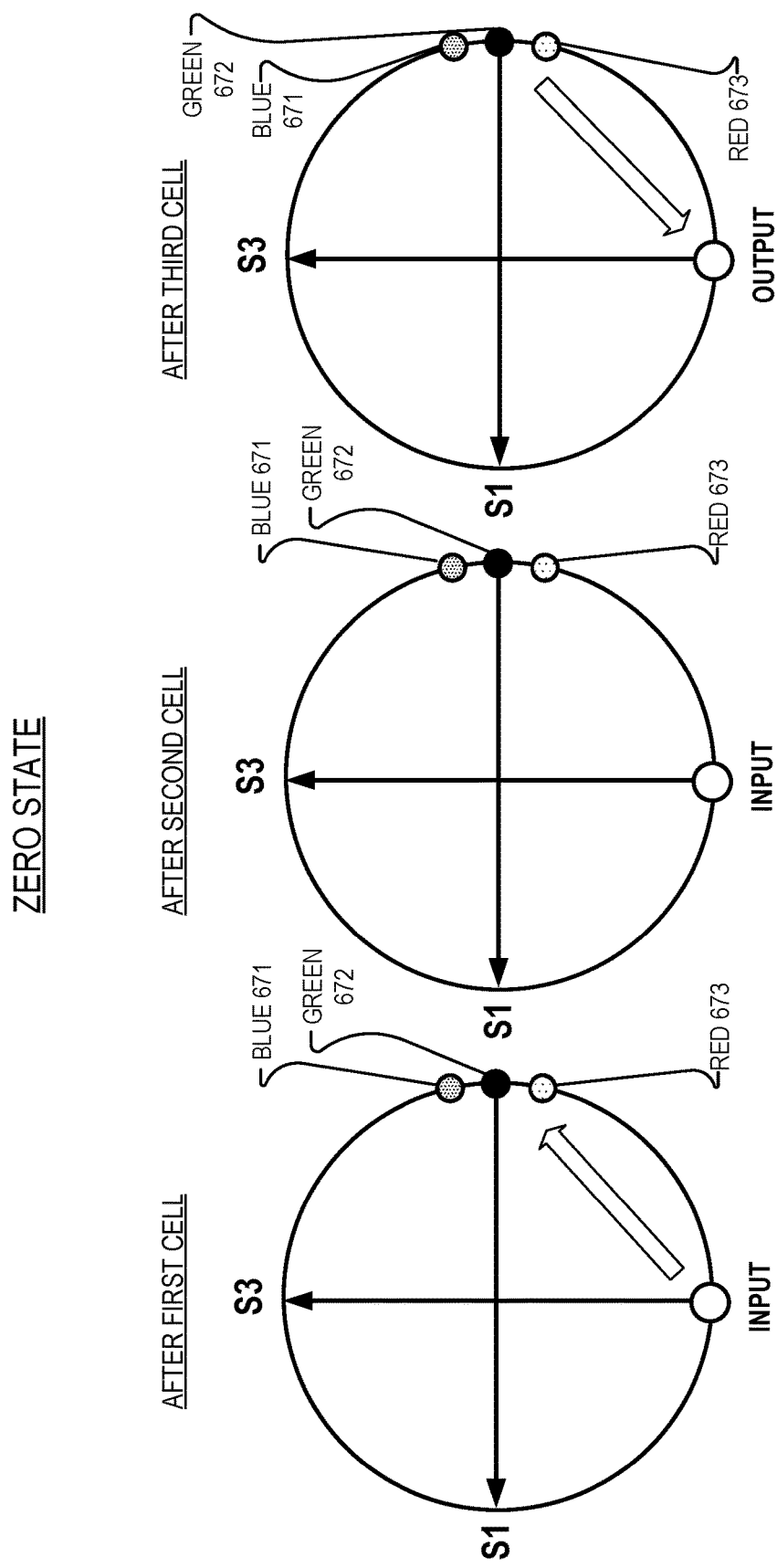
FIGS. 6A and 6B illustrate Poincaré spheres corresponding to the liquid crystal cells for the zero retardance state and the π retardance state of a polarization modulator, in accordance with aspects of the disclosure.
Figure 6B:
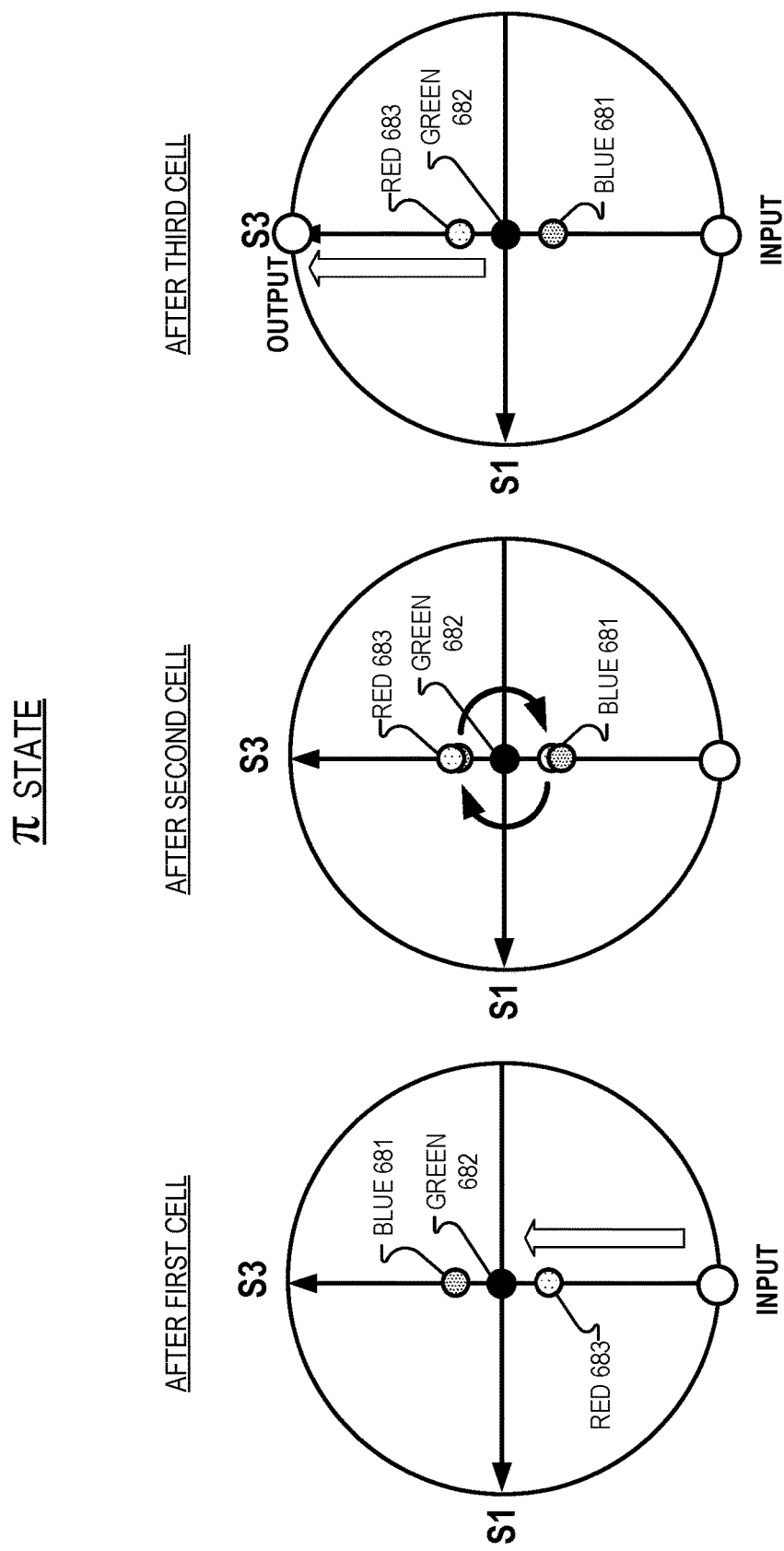

FIGS. 6A and 6B illustrate Poincare spheres corresponding to the liquid crystal cells for the zero retardance state and the π retardance state of polarization modulator 533, in accordance with implementations of the disclosure. In FIG. 6A, the left Poincare sphere illustrates that left-hand circularly polarized input light becomes linearly polarized light (at least for green visible light component 672) as the light exits first liquid crystal cell 361, in the zero retardance state of polarization modulator 533. Blue light component 671 of the input light and red light component 673 of the input light are nearly linearly polarized. The middle Poincare sphere of FIG. 6A illustrates that the light exiting second liquid crystal cell 362 retains the polarization state of the light exiting first liquid crystal cell 361 since switchable half-waveplate 562 is switched off (deactivated). The right Poincare sphere of FIG. 6A illustrates that the light exiting third liquid crystal cell 363 is converted back to the original polarization state of the input light (the polarization state of the input light prior to the input light encountering first liquid crystal cell 361). Since third liquid crystal cell 363 has the same liquid crystal type as first liquid crystal cell 361 and they are aligned to cancel each other, polarization modulator 533 is achromatic for light propagating through it in the zero retardance state.

In FIG. 6B, the left Poincare sphere illustrates that left-hand circularly polarized input light becomes linearly polarized light (at least for green visible light component 682) as the light exits first liquid crystal cell 361, in the π retardance state of polarization modulator 533. Blue light component 681 of the input light and red light component 683 of the input light are nearly linearly polarized. Since the second liquid crystal cell 362 is aligned in the 45 degree direction in the π retardance state for achromatic functionality, the red light component 683 exiting second liquid crystal cell 362 is converted to the polarization state of the blue light component 681 exiting the first liquid crystal cell 361 and the blue light component 681 exiting second liquid crystal cell 362 is converted to the polarization state of the red light component 683 exiting the first liquid crystal cell 361. The right Poincare sphere of FIG. 6B illustrates that the light exiting third liquid crystal cell 363 is an opposite handedness of the input light prior to the input light encountering first liquid crystal cell 361. In the particular illustration of FIG. 6B, the light exiting third liquid crystal cell 363 is right-hand circularly polarized light and the input light prior to encountering first liquid crystal cell 361 is left-hand circularly polarized light. Polarization modulator 533 is achromatic for light propagating through it in the π retardance state because second liquid crystal cell 362 is activated to provide the achromatic effect.

FIGS. 6A and 6B show that polarization modulator 533 is configured to minimize retardance error for green light (e.g. approximately 550 nm wavelength) propagating through polarization modulator 533 since the green light components 672 and 682 are illustrated in a circularly polarized state or a linear polarized state (on equator of the Poincare spheres). In implementations of the disclosure, the International Commission on Illumination (referred to as "CIE") 2006 2-degree color matching function may be used as a weighting function to minimize retardance error for green light.

A first equation in FIG. 7A provides an average retardance error for a given voltage state for a particular wavelength (λ) of light. A second equation in FIG. 7B provides a sum of retardance error with average human eye sensitivity for normal (orthogonal to the eye) incident light. The switchable waveplates in polarization modulator 533 may be driven to different state using 0 VDC and 10 VDC. Therefore, the second equation in FIG. 7B includes a sum of the retardance error for the 0 VDC state (it retardance state) and the 10 VDC state (zero retardance state). Since the polarization modulator 533 may be switched between these states at relatively high speeds (e.g. 1 ms or less), the sum of the retardance error for a 0 VDC state and a 10 VDC state is illustrated in the second equation presented in FIG. 7B. The selection of the liquid crystal types and other aspects of each switchable waveplate may be designed to reduce or minimize retardance error for green light since the human eye has the highest sensitivity to green light.

Although FIGS. 6A-7B may be most relevant for optimizing for human vision of visible light, the disclosed design techniques may also be utilized to minimize retardance error for different wavelengths of light. For example, in some contexts, it may be desirable to minimize retardation error for a particular wavelength of infrared light.

Figure 8:
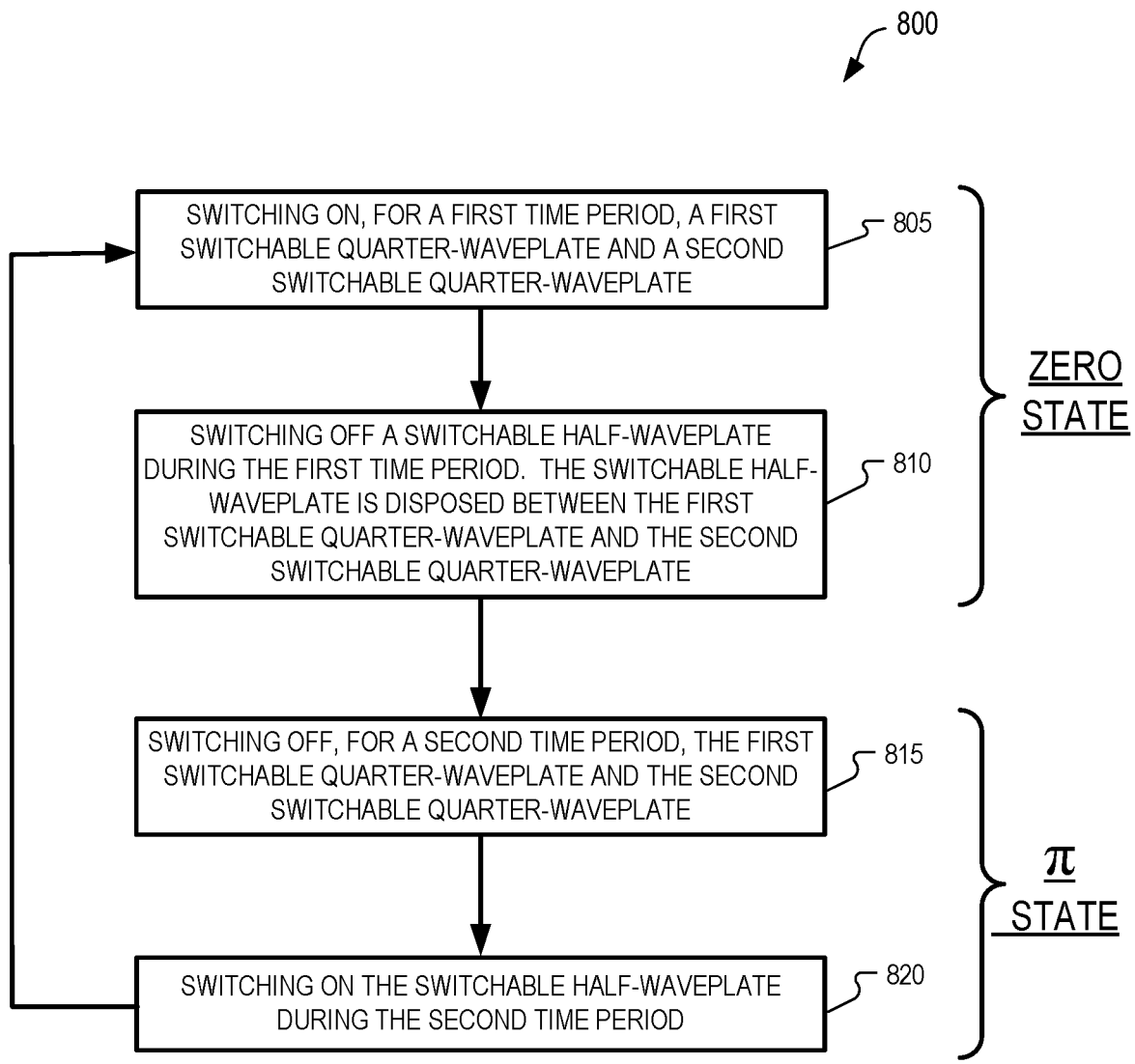
FIG. 8 illustrates a process of polarization modulation of light, in accordance with aspects of the disclosure

FIG. 8 illustrates a process 800 of polarization modulation of light, in accordance with aspects of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel. Processing logic 291 or 595 may execute all or a portion of process 800.

In process block 805, a first switchable quarter-waveplate (e.g. 561) and a second switchable quarter-waveplate (e.g. 563) are switched on (activated) for a first time period.

In process block 810, a switchable half-waveplate (e.g. 562) is also switched off (deactivated) during the first time period. The switchable half-waveplate is disposed between the first switchable quarter-waveplate and the second switchable quarter-waveplate. Light propagating through the first switchable quarter-waveplate, the switchable half-waveplate, and the second switchable quarter-waveplate during the first time period retains a handedness of a circular polarization of the light as the light exits the second switchable quarter-waveplate. With the switchable half-waveplate off and the first switchable quarter-waveplate and second switchable quarter-waveplate switched on during the first time period, a polarization modulator (e.g. 533) may be in a zero retardance state.

In process block 815, the first switchable quarter-waveplate and the second switchable quarter-waveplate are switched off during a second time period that does not overlap the first time period.

In process block 820, the switchable half-waveplate is switched on for the second time period. The light propagating through the first switchable quarter-waveplate, the switchable half-waveplate, and the second switchable quarter-waveplate during the second time period changes to an opposite handedness circular polarization as the light exits the second switchable quarter-waveplate. With the switchable half-waveplate on and the first switchable quarter-waveplate and second switchable quarter-waveplate switched off during the second time period, a polarization modulator (e.g. 533) may be in a π retardance state.

Process 800 may return to process block 805 after executing processing block 820.

In some implementations of process 800, the first switchable quarter-waveplate includes a first type of liquid crystals configured to rotate an optical axis of the light parallel to a first plane of the first switchable quarter-waveplate and the second switchable quarter-waveplate also includes the first type of liquid crystals configured to rotate the optical axis of the light parallel to a second plane of the second switchable quarter-waveplate. The switchable half-waveplate includes a second type of liquid crystals configured to rotate the optical axis of the light perpendicular to a plane of the switchable half-waveplate.

A plane of rotation of the light is forty-five degrees to an x-axis of the plane of the switchable half-waveplate, in some implementations of process 800. The first plane of the first switchable quarter-waveplate may be parallel to the second plane of the second switchable quarter-waveplate.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 291 or 595) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A polarization modulator comprising:
   a first liquid crystal cell having a first type of liquid crystals configured to rotate an optical axis of light parallel to a first plane of the first liquid crystal cell;

a second liquid crystal cell configured to receive the light from the first liquid crystal cell, the second liquid crystal cell having a second type of liquid crystals configured to rotate the optical axis of the light perpendicular to a second plane of the second liquid crystal cell; and a third liquid crystal cell configured to receive the light from the second liquid crystal cell, the third liquid crystal cell having the first type of liquid crystals configured to rotate the optical axis of the light parallel to a third plane of the third liquid crystal cell, and wherein the second liquid crystal cell is disposed between the first liquid crystal cell and the third liquid crystal cell.

2. The polarization modulator of claim 1, wherein the first liquid crystal cell is configured as a first switchable quarter-waveplate, the second liquid crystal cell is configured as a switchable half-waveplate, and the third liquid crystal cell is configured as a second switchable quarter-waveplate.

3. The polarization modulator of claim 2 further comprising:

processing logic configured to, in a zero retardance state of the polarization modulator, drive the switchable half-waveplate to a first state of the switchable half-waveplate and drive the first switchable quarter-waveplate and the second switchable quarter-waveplate to a second state, and wherein the process logic is further configured to, in a π retardance state of the polarization modulator, drive the switchable half-waveplate to a second state of the switchable half-waveplate and drive the first switchable quarter-waveplate and the second switchable quarter-waveplate to a first state.

4. The polarization modulator of claim 3, wherein, in the zero retardance state of the polarization modulator a circularly polarized orientation of the light exiting the third liquid crystal cell is a same handedness as the light entering the first liquid crystal cell, and wherein, in the π retardance state of the polarization modulator, the circularly polarized orientation of the light exiting the third liquid crystal cell is an opposite handedness as the light entering the first liquid crystal cell.

5. The polarization modulator of claim 1, wherein a plane of rotation of the light is forty-five degrees to an x-axis of the second plane of the second liquid crystal cell.

6. The polarization modulator of claim 1, wherein the polarization modulator is configured to minimize retardance error for green light propagating through the first liquid crystal cell and the second liquid crystal cell.

7. The polarization modulator of claim 1, wherein the first plane of the first liquid crystal cell is parallel to the second plane of the second liquid crystal cell.

8. The polarization modulator of claim 1, wherein the first type of liquid crystals is ferroelectric liquid crystals, in plane switching liquid crystals, fringe field switching liquid crystals, uniform lying helix liquid crystals, or cholesteric liquid crystals.

9. The polarization modulator of claim 1, wherein the second type of liquid crystals is optically compensated bend liquid crystals, electronically controlled birefringence liquid crystals, or vertical alignment liquid crystals.

10. A method comprising:

switching on, for a first time period, a first switchable quarter-waveplate and a second switchable quarter-waveplate;

switching off a switchable half-waveplate during the first time period, wherein the switchable half-waveplate is disposed between the first switchable quarter-waveplate and the second switchable quarter-waveplate, and wherein light propagating through the first switchable quarter-waveplate, the switchable half-waveplate, and the second switchable quarter-waveplate during the first time period retains a handedness of a circular polarization of the light as the light exits the second switchable quarter-waveplate;

switching off, for a second time period not overlapping the first time period, the first switchable quarter-waveplate and the second switchable quarter-waveplate; and switching on the switchable half-waveplate during the second time period, wherein the light propagating through the first switchable quarter-waveplate, the switchable half-waveplate, and the second switchable quarter-waveplate during the second time period changes to an opposite handedness circular polarization as the light exits the second switchable quarter-waveplate.

11. The method of claim 10, wherein the first switchable quarter-waveplate includes a first type of liquid crystals configured to rotate an optical axis of the light parallel to a first plane of the first switchable quarter-waveplate, and wherein the second switchable quarter-waveplate also includes the first type of liquid crystals configured to rotate the optical axis of the light parallel to a second plane of the second switchable quarter-waveplate, and further wherein, the switchable half-waveplate includes a second type of liquid crystals configured to rotate the optical axis of the light perpendicular to a plane of the switchable half-waveplate.

12. The method of claim 11, wherein a plane of rotation of the light is forty-five degrees to an x-axis of the plane of the switchable half-waveplate.

13. The method of claim 11, wherein the first plane of the first switchable quarter-waveplate is parallel to the second plane of the second switchable quarter-waveplate.

14. The method of claim 11, wherein the first type of liquid crystals is ferroelectric liquid crystals, in plane switching liquid crystals, fringe field switching liquid crystals, uniform lying helix liquid crystals, or cholesteric liquid crystals.

15. The method of claim 11, wherein the second type of liquid crystals is optically compensated bend liquid crystals, electronically controlled birefringence liquid crystals, or vertical alignment liquid crystals.

16. A head mounted display (HMD) comprising:

a display configured to emit image light to an eyebox area;

a polarization rotator configured to modulate the image light between a first circular polarization orientation and a second circular polarization orientation having an opposite handedness as the first circular polarization orientation, wherein the polarization rotator includes:

a first liquid crystal cell having a first type of liquid crystals configured to rotate an optical axis of the image light parallel to a first plane of the first liquid crystal cell;

a second liquid crystal cell having a second type of liquid crystals configured to rotate the optical axis of the image light perpendicular to a second plane of the second liquid crystal cell; and a third liquid crystal cell having the first type of liquid crystals configured to rotate the optical axis of the image light parallel to a third plane of the third liquid crystal cell, wherein the second liquid crystal cell is disposed between the first liquid crystal cell and the third liquid crystal cell.

17. The HMD of claim 16, wherein the first liquid crystal cell is configured as a first switchable quarter-waveplate, the second liquid crystal cell is configured as switchable half-waveplate, and the third liquid crystal cell is configured as a second switchable quarter-waveplate.

18. The HMD of claim 17, wherein, in a zero retardance state of the polarization rotator, the first switchable quarter-waveplate and the second switchable quarter-waveplate are configured to rotate the optical axis to be opposite and orthogonal to each other.

19. The HMD of claim 16, wherein the polarization rotator is configured to minimize retardance error for green image light propagating through the polarization rotator.

* * * * *